United States Patent
Horito et al.

(10) Patent No.: US 9,640,843 B2
(45) Date of Patent: May 2, 2017

(54) BATTERY MANAGEMENT SYSTEM (71) Applicant: Rocketship, Inc., Provo, UT (US)

(72) Inventors: Michael S. Horito, Provo, UT (US); Zack D. Bomsta, Provo, UT (US)

(73) Assignee: ROCKETSHIP, INC., Provo, UT (US)

( * ) Notice: Subject to any disclaimer, the term of this patent is extended or adjusted under 35 U.S.C. 154(b) by 0 days.

(21) Appl. No.: 14/900,130

(22) PCT Filed: Jun. 5, 2014

(86) PCT No.: PCT/US2014/040997
§ 371 (c)(1),
(2) Date: Dec. 18, 2015

(87) PCT Pub. No.: WO2014/204649
PCT Pub. Date: Dec. 24, 2014

(65) Prior Publication Data
US 2016/0149271 A1    May 26, 2016

Related U.S. Application Data (60) Provisional application No. 61/836,233, filed on Jun. 18, 2013.

(51) Int. Cl.
| | | |
|---|---|---|
| H02J 7/00 | (2006.01) | |
| H01M 10/42 | (2006.01) | |
| H01M 10/48 | (2006.01) | |
| B60L 11/18 | (2006.01) | |

(52) U.S. Cl.
CPC ..... *H01M 10/4257* (2013.01); *B60L 11/1861* (2013.01); *H01M 10/425* (2013.01); *H01M 10/4207* (2013.01); *H01M 10/482* (2013.01); *H02J 7/0029* (2013.01); *H02J 7/0031* (2013.01); *H02J 7/0072* (2013.01); *H02J 7/0091* (2013.01); *H01M 2010/4271* (2013.01); *H01M 2010/4278* (2013.01); *H01M 2220/20* (2013.01); *H02J 2007/004* (2013.01)

(58) Field of Classification Search
CPC ....... H02J 7/0003; H02J 7/0004; H02J 7/0054
USPC ........................................................ 320/112
See application file for complete search history.

(56) References Cited

U.S. PATENT DOCUMENTS

| | | | |
|---|---|---|---|
| 5,683,827 A | 11/1997 | Yu | |
| 5,875,085 A | 2/1999 | Farley | |
| 8,344,694 B2 | 1/2013 | Zhang et al. | |
| 8,355,233 B2 | 1/2013 | Schumacher et al. | |
| 8,941,463 B2* | 1/2015 | Rovik | B60L 3/12 320/127 |
| 2003/0139888 A1 | 7/2003 | Burns | |
| 2004/0135544 A1 | 7/2004 | King et al. | |
| 2006/0082346 A1 | 4/2006 | Nagasawa | |
| 2008/0050645 A1 | 2/2008 | Kai et al. | |
| 2008/0106238 A1 | 5/2008 | Ragsdale | |
| 2008/0299938 A1 | 12/2008 | Meshenberg | |
| 2008/0303527 A1 | 12/2008 | Fechalos et al. | |
| 2009/0167312 A1 | 7/2009 | Keates et al. | |
| 2009/0187781 A1 | 7/2009 | Gronemeier et al. | |
| 2010/0007293 A1* | 1/2010 | Meadors | B60L 11/1811 318/139 |
| 2010/0052615 A1 | 3/2010 | Loncarevic | |
| 2012/0187774 A1 | 7/2012 | Tabatabaei et al. | |
| 2012/0274142 A1* | 11/2012 | Tinglow | H02J 7/0026 307/77 |
| 2013/0063097 A1* | 3/2013 | Valentine | G06F 1/3212 320/136 |
| 2013/0086409 A1 | 4/2013 | Lu et al. | |
| 2013/0100563 A1 | 4/2013 | Cho et al. | |

FOREIGN PATENT DOCUMENTS

| | | |
|---|---|---|
| WO | 2008055505 A1 | 5/2008 |
| WO | 2011069162 A1 | 6/2011 |
| WO | 2013014674 A1 | 1/2013 |

OTHER PUBLICATIONS

International Search Report and Written Opinion, PCT Application No. PCT.US2014/040997, mailed Oct. 3, 2010.
U.S. Appl. No. 14/975,351, High-Current Battery Management System, filed Dec. 18, 2015.

* cited by examiner

*Primary Examiner* — Arun Williams
(74) *Attorney, Agent, or Firm* — Lowenstein Sandler LLP

(57) ABSTRACT

An isolation apparatus includes isolation circuitry that includes multiple semiconductor switches arranged electrically in parallel to isolate, from an electrical system, a plurality of battery cells of a battery capable of providing high levels of current. The apparatus includes a microcontroller operatively coupled to the isolation circuitry, wherein the battery cells are isolated from the electrical system to which the battery is connected when the microcontroller switches off the multiple semiconductor switches. The apparatus provides cell-balancing, circuit isolation, trace matching, split columns, heat-tied use of materials and slow-speed switching to provide safety through isolation, equalization and stress reduction.

23 Claims, 4 Drawing Sheets

BATTERY MANAGEMENT SYSTEM

CROSS-REFERENCE TO RELATED APPLICATION

This application is a nationalization of PCT/US2014/40997, filed Jun. 5, 2014, which claims the benefit of U.S. Provisional Patent Application No. 61/836,233, filed Jun. 18, 2013, wherein the entire disclosure of both applications are incorporated herein by this reference.

BACKGROUND

1. Technical Field

The present disclosure relates generally to batteries, and more specifically to management of battery cells within a rechargeable battery.

2. Description of Related Art

Battery management systems are commonly found in rechargeable batteries. Rechargeable batteries typically include one or more battery banks. The battery banks are also sometimes referred to as battery packs and are each made up of multiple rechargeable battery cells.

When using a rechargeable battery for a desired application, users often have three main concerns: protecting battery cells from damage, prolonging battery cell life, and maintaining battery cells in the state in which the battery cells were intended to be used in an application. Battery cell damage can result in danger to users, so safety may also be a concern when using rechargeable batteries.

One way to distinguish contemporary rechargeable batteries from older dry cell batteries is to compare the newer power cell batteries to the older energy cell batteries. Power cell batteries allow massive amounts of current to be provided with only a small amount of stored energy. Alternatively, dry cell batteries, such as an old truck battery, are able to supply a small amount of current for a long period of time because the dry cells hold a large amount of energy.

Contemporary rechargeable batteries are commonly replaced in one of two ways: first, on a schedule, possibly based on the rechargeable battery's expected life span; and second, subsequent the life of the rechargeable battery. Replacing a battery on a schedule and possibly prior to its expiration, or waiting until the death of a battery is often a costly approach.

To address this concern, a battery management system can monitor a number of parameters that affect performance of a rechargeable battery. The system can monitor the rechargeable battery cells of the rechargeable battery's battery pack. The system can monitor the battery cells and measure their state of charge (SOC), their state of health (SOH), and their internal and ambient battery temperatures.

Battery packs often operate with one of three battery cell technologies. These include Nickel-Cadmium (NiCd), Nickel-Metal Hydride (NiMH), and Lithium-Ion (Li-Ion). Each of these different battery cell technologies has their pros and cons. For example, on the one hand, Li-Ion battery cells have low weight and high energy, but are relatively expensive. On the other hand, NiCd and NiMH battery cells are less expensive for an equivalent weight, but will hold less energy than the Li-Ton battery cells.

A single Li-Ion battery cell within a standard battery pack typically provides an output voltage of around 3.7V. This output voltage commonly has a narrow range of safe operating voltages between 3V and 4.2V. Operation outside of this range can result in irreparable damage to the cells of a battery pack, which in turn can limit the life of the battery pack.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

The following is intended to provide a detailed description of examples of the disclosure and should not be taken to be limiting of the disclosure itself. Rather, any number of variations may fall within the scope of the disclosure, which is defined in the claims following the description.

In one embodiment, a rechargeable battery system of the present disclosure includes a battery system that has a battery bank and a battery management system (BMS). The battery bank has rechargeable battery cells that are connected in a way that allows the battery cells to be discharged when the battery system is in operation. The BMS is connected to the battery bank to allow communications between the battery bank and the BMS. The BMS is configured to perform cell balancing within the battery bank. Cell balancing allows each of the rechargeable battery cells to be maintained in a similar electrical state. In addition, the BMS includes isolation circuitry. The isolation circuitry allows the BMS to provide electrical isolation of the battery bank from the load across the battery.

In another embodiment, the BMS may include data management circuitry to collect battery system information for each of the rechargeable battery cells of the battery bank. This data management circuitry may work with communications circuitry to transmit selected battery system information, and this communication may be performed through wired or wireless communications circuitry. In one embodiment, for example, the wired communications circuitry may be performed through Ethernet communication circuitry.

In still other embodiments, the BMS can include short circuit damage protection circuitry. The short circuit damage protection circuitry can be configured to isolate the battery bank when a threatening electrical system short circuit is detected within or even outside of the battery system. Further, the BMS can include data collection circuitry that is configured to collect and analyze battery system information from each of the rechargeable battery cells of the battery bank. Finally, the BMS can have global positioning system (GPS) communications circuitry or even universal serial bus (USB) system communications circuitry.

In another embodiment, a battery system is designed where the battery system has a battery pack with a rechargeable battery cell and a BMS connected to the battery pack. The BMS includes isolation circuitry that allows the BMS to be configured to allow electrical isolation of the battery pack. Also included in the battery system is data management circuitry that collects battery system information from the rechargeable battery cell of the battery pack.

In addition, the battery system can include cell balancing circuitry that is configured to perform cell balancing when more than one rechargeable battery cell is present in the battery pack. Finally, in additional embodiments of the present disclosure, communications circuitry is also included that is configured to transmit selected system information such as health metrics, location, use logs, and other battery system information. The communications circuitry includes wireless communications circuitry to transmit the selected battery system information to a site remote from the BMS.

Figure 1:
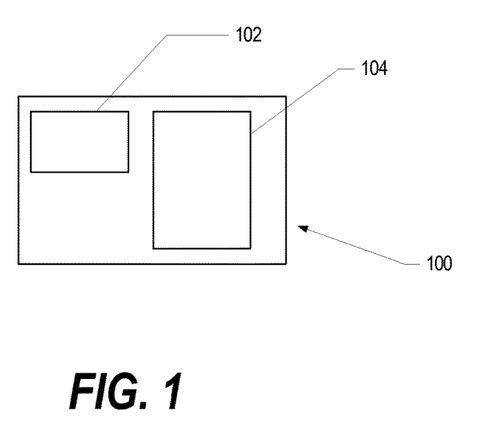
FIG. 1 illustrates a block diagram showing a general embodiment of a battery management system (BMS) according to principles of the present disclosure.

FIG. 1 illustrates a block diagram showing a general embodiment of a battery system 100 according to principles of the present disclosure. Battery system 100 includes a BMS 102 and a battery pack 104. Battery pack 104 is also sometimes known as a battery bank and includes a number of rechargeable Li-Ion battery cells. The BMS 102 can monitor and control cell balancing within battery pack 104. Cell balancing assists in storage and/or delivery of power (in the form of Watts) to or from the battery pack 104. Energy (Joules) is the power that is delivered over time.

In other words, the amount of energy that the battery system 100 accumulates or dissipates is the amount of power that is transferred during a set amount of time. The BMS 102 monitors individual cells of battery pack 104 to determine appropriate times to activate balancing and/or protection circuitry to help prevent damage to battery system 100. For example, damage to the battery pack 104 may occur when corrective actions are not taken after the BMS 102 detects unsafe energy transfer levels. By monitoring such parameters, the BMS 102 is able to prolong the life of the battery pack 104 and to more efficiently utilize energy consumption and production in the battery pack 104.

Figure 2:
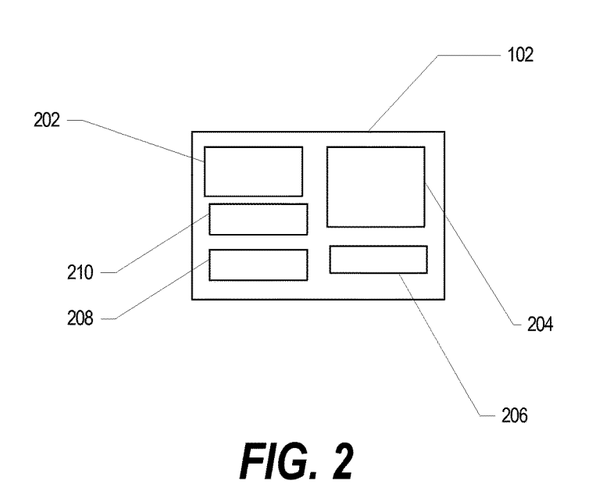
FIG. 2 illustrates a block diagram showing the BMS of FIG. 1 in greater detail.

FIG. 2 illustrates a block diagram showing the BMS 102 in greater detail. Specifically shown are a communication circuitry 202, a data management circuitry 204, an isolation circuitry 206, a short circuit protection circuitry 208, and a cell balancing circuitry 210.

In one embodiment, the BMS 102 of the battery system 100 can be used in a vehicle such as a truck where the BMS 102 is configured to allow battery pack 104 to reliably perform. For example, the communication circuitry 202 of the BMS 102 can be configured to communicate battery system indicators to interested parties. These battery system indicators are sometimes referred to herein as health indicators such as a battery cell threshold voltage, a battery current threshold, battery charge and discharge rates, number of detected short circuits, and general health of BMS 102. The interested parties that may receive these communications can be located on site or remotely to BMS 102.

One function of the data management circuitry 204 is to collect battery health indicators. These battery health indicators are discussed in greater detail herein. The collection of such information is sometimes referred to as data logging.

The isolation circuitry 206 is designed to provide a way to isolate the battery pack 104 in order to ameliorative actions that may be taken in relation to the battery system 100 when the BMS 102 detects problems that could adversely affect battery life in the battery system 100. In certain embodiments, through wireless or other means of communication, the isolation circuitry 206 can be programmably or manually changed to be active or inactive during use.

Additionally, the short circuit protection circuitry 208 is available to detect and protect the battery system 100 from a short circuit. The short circuit could occur anywhere in the entire electrical system that may adversely affect battery system 100. The short circuit protection circuitry 208 is configured to distinguish between an actual short circuit and a burst of electrical current on the order of hundreds to thousands of amps that might be needed for the battery system 100 to start something like a large semi-truck. Furthermore, the cell balancing circuitry 210 allows for more predictable, safe and prolonged operation of battery system 100.

Figure 3:
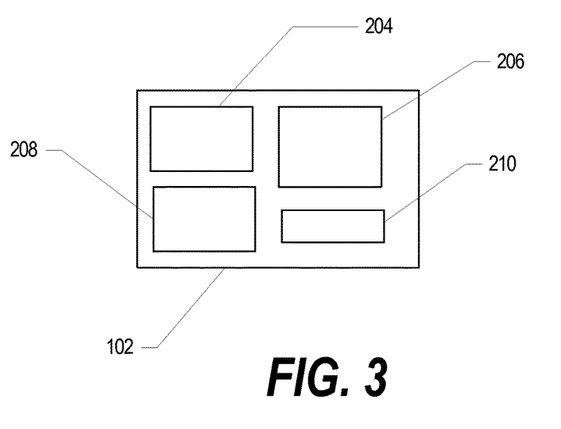
FIG. 3 illustrates another block diagram of the BMS of FIG. 2 with a focus on certain aspects of the BMS.

FIG. 3 illustrates another block diagram of the BMS 102 that can include the data management circuitry 204, the isolation circuitry 206, the cell balancing circuitry 210, and the short circuit protection circuitry 208. In one embodiment, the data management circuitry 204 can provide for the management of data as it relates to the battery system 100. Data relevant to the battery system 100 can be periodically collected over the life of the battery system 100. This data is then available to be used to make decisions on how to handle the different states that battery system 100 may enter while in operation or at rest.

In order to monitor health of the battery system 100, the collected data can be analyzed and compared to expected values based on usage of the battery system 100. This data is also known as battery health data. Additionally, the data management circuitry 204 is configured to allow the battery health data to be accessed by the communications circuitry 202 as described in detail in relation to FIG. 4.

Battery health data is also sometimes referred to as battery health indicators. Some battery health indicators, such as battery cell threshold voltage, offer multiple parameters that can be monitored where different actions can be taken to protect the life of the battery system 100. Battery cell threshold voltage provides three potential battery health indicators. Battery cell threshold voltage is the point at which user action should occur to assist in maintaining the health of battery pack 104. If action is taken when a threshold voltage is indicated, damage to the life of battery system 100 is likely to be prevented. The threshold voltages can include: (1) reserve voltage, (2) low voltage lock-out, and (3) critical voltage.

Reserve voltage means that there is only enough energy remaining in the battery pack 104 to be used one more time; for example, one more time to start a truck. The indication is a prompt to force user intervention to again use the battery pack 104 for its designed purpose. In other words, the reserve voltage threshold is analogous to a reserve gas tank on a vehicle. The vehicle may run out of gas, but the driver can then switch to the reserve gas tank to have enough fuel to start the vehicle and drive to the nearest gas station to completely fill up the gas tank.

An example of the battery pack 104 reserve voltage is 30% remaining energy in battery system 100. At this point, manual intervention may be required for use of the battery system 100 one more time before the battery system 100 must be fully recharged.

The second threshold voltage is low voltage lockout. Low voltage lock-out occurs when the battery system 100 is discharged below the reserve voltage. For example, when the battery pack 104 is discharged to 5% energy remaining (or some other low value), the low voltage lock-out can trigger the BMS 102 to temporarily prevent a user from using the battery pack 104 of battery system 100.

Of note, 5% remaining energy means that a jump start would likely be required to start up a vehicle. When low voltage lock-out is indicated, the battery pack 104 is protected because the BMS 102 can disable circuitry that would allow a user to even attempt to start the vehicle. Rather, the user may need to isolate the load for recharging of the battery pack 104 to a "safe" level before attempting a current discharge that would be required to sustain load requirements across the battery system 100.

Disconnecting the battery system 100 is also known as isolating the load and is discussed in greater detail hereinafter. In this manner, damage to battery system 100 is more likely to be prevented because battery pack 104 is not allowed to reach the third threshold, critical voltage. As stated, the critical voltage is the third battery cell threshold voltage. If critical voltage is detected by the BMS 102, the battery pack 104 can begin to lose much of its health. Because of this danger, when critical voltage is detected, hibernation mode is commonly entered.

Hibernation mode is that mode where current consumption from the battery pack 104 is reduced by a factor on the order of a hundred times. In other words, current consumption is much less than would otherwise be consumed. This mode is similar to hibernation mode in a laptop computer and can also be referred to as a "low power draw" mode for the battery system 100. Of further note, hibernation mode can be entered at times other than after detecting a critical voltage threshold. For example, similar to a common computer, after detecting a period of non-use in battery system 100 and to preserve energy of battery system 100, hibernation mode can be entered.

In addition to hibernation mode of the battery system 100, the isolation circuitry 206 is designed to respond to certain battery system 100 conditions. For example, the isolation circuitry 206 can respond when certain threshold voltages are detected or a problem such as a short circuit is discovered in or around battery system 100. The response may include corrective actions that are can be based on data analysis of data that has been collected by the data management circuitry 204. If the collected data shows that a short circuit has occurred within the battery system 100, then the short circuit protection circuitry 208 can be activated.

Short circuit protection circuitry 208 includes various types of circuitry. As previously described, the battery system 100 is equipped with the BMS 102 that allows battery pack 104 to distinguish between a short circuit and a needed current surge to start something like a truck engine. During operation of the battery system 100, the short circuit protection circuitry 208 interacts with the isolation circuitry 206 to allow large current surges that, unlike a short circuit, may be needed. In prior BMSs, these large current surges would be handled like a short circuit whether or not the surge was needed. In the case of an actual short circuit, the isolation circuitry 206 prevents any further discharge of the battery system 100 for any reason at all until the short circuit is removed.

The present BMS 102 can also provide functionality that allows the battery pack 104 to be shut off electronically. This functionality is made possible by designing the BMS 102 such that the size of the magnetic field that is generated around a bus bar is monitored to detect current flow levels within the battery pack 104 and to take battery action based on the current flow.

Conventional BMSs are known to diagnose and report a short circuit. A short circuit is reported when current levels flowing from the battery pack are detected to have risen into the 100 mA range for an extended period of time (on the order of milliseconds). When a short circuit is reported by such a conventional BMS, the BMS simply shuts down its accompanying battery pack. Because short circuits are reported when only 100 mA flows for too long, in the event that a current level of 100 A is detected flowing from the battery pack, the conventional BMS reports a short circuit after an even shorter period of time. In these BMSs, when a potentially damaging current flow is detected, current flow from the battery pack is terminated to protect the battery pack. However, if a battery pack is to be used to successfully start, for example a truck, an even higher level of current flow is required for an even longer period of time.

Advantageously, the presently disclosed BMS 102 is configured to recognize the difference between an undesirable short circuit and a necessary current surge for starting something like a semi-truck or other such equipment that may need high current flow for a sufficient length of time. Because of the short circuit protection circuitry 208, the BMS 102 can detect and allow current levels on the order of 2200 A for time periods of approximately 0.5 s. These amperage levels are programmable and may be set for different applications of use of the battery pack 104.

As described in relation to the threshold voltage of low-voltage lock-out, the BMS 102 can isolate a load through circuit isolation. Circuit isolation is also sometimes referred to as lock-out. Lock-out may be accomplished with a number of different design techniques.

A first design technique that accomplishes the lockout result is through trace design on a PC-Board. Typically, the PC-Board used for lock-out is the same PC-Board that holds BMS 102, and trace-matching allows lock-out to occur based on slightly different transistor activation time. Other trace design techniques to accomplish isolation are with the use of split columns or with a heat-tied arrangement. Slow speed transistor switching accomplishes a similar result with MOSFET transistor types.

A second design technique to accomplish lock-out is through customized circuitry such as an analog to digital converter, a reserve lock-out, a low-voltage lock-out, a user initiated lock-out, a temperature lock-out, or a short circuit lock-out.

Another design technique to accomplish lock-out uses circuit adaptation. This circuit adaptation is enabled when the battery system 100 shows a low power draw such as hibernation mode. Furthermore, under certain conditions, semiconductor switches are programmed to toggle to provide lockout options.

Figure 4:
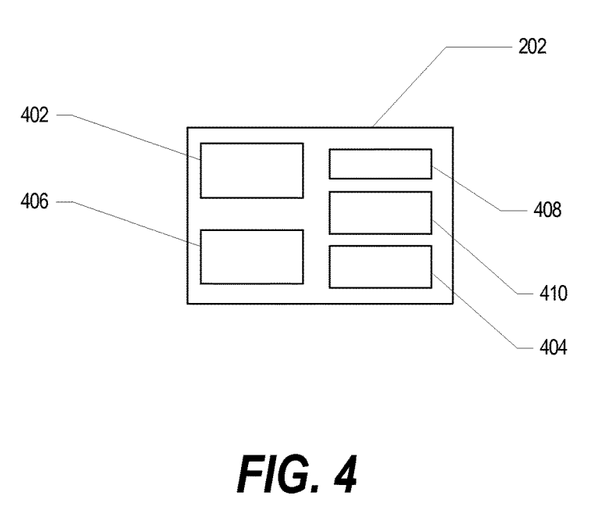
FIG. 4 is a more detailed block diagram of communication circuitry of the BMS of FIG. 2 in which battery system information can be shared in various ways.

FIG. 4 is a more detailed block diagram of the BMS communication circuitry 202 wherein battery system information may be shared in various ways. Firmware dictates utilization of available hardware for such sharing. Thus, the battery system information may be shared in a variety of ways.

The battery communication circuitry 202 can be configured to report battery health indicators to a remote site. This can be accomplished in a number of ways. As illustrated, a Universal Serial Bus (USB) connection 402, an Ethernet connection 404, a Global System for Mobile Communications (GSM) 406, or Wi-Fi hotspot functionality 408 can be used. Furthermore, a Global Positioning System (GPS) 410 can be included within the battery communication circuitry 202 to assist in determining a location of the battery pack 104. This is particularly useful if the battery system 100 happens to be lost, located in a stolen vehicle, or has some other need to retrieve its global coordinates.

In this manner, the battery health indicators may be monitored by allowing battery communication circuitry 202 to send the information to a remote location. For example, fleet headquarters may be interested in monitoring a number of different trucks where each truck uses its own battery pack 104. In this way, truck drivers may be given a warning to take action to maintain health of their personal battery system 100. This function is similar to the function of a check engine light, but relating to battery pack health where more than just the driver is provided with the battery heath information.

Figure 5:
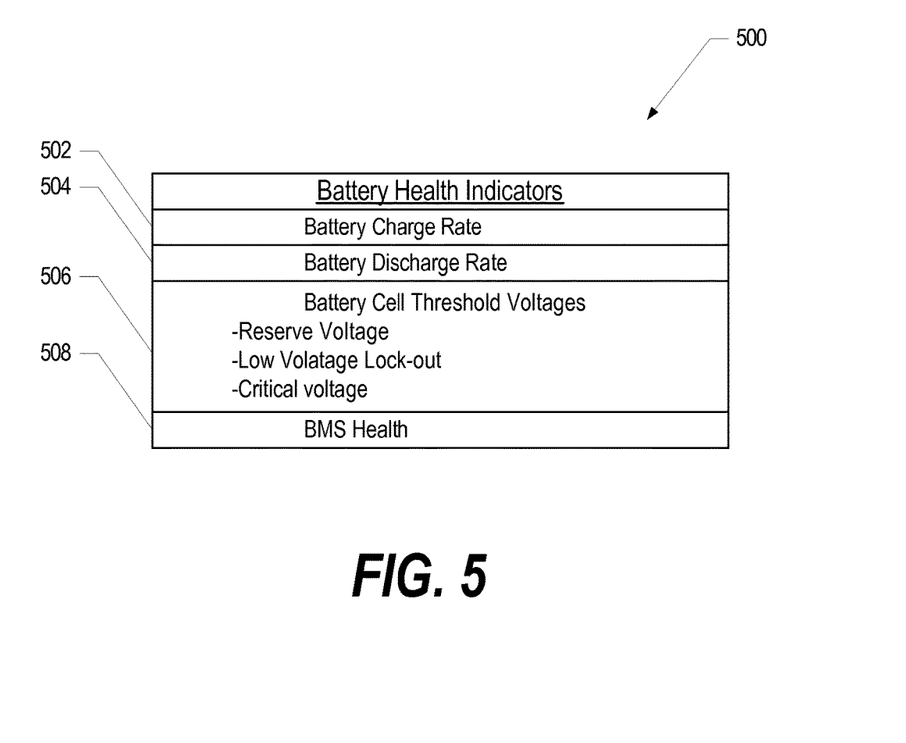
FIG. 5 is a table of exemplary battery system indicators that are to be monitored and shared by the communication circuitry of FIG. 4.

FIG. 5 is a table of exemplary battery system indicators 500 that are to be monitored and shared by the battery communication circuitry 202. These include battery health indicators that allow a user of the battery system 100 to better understand the health of the battery pack 104 and to know when to take action that may assist in prolonging the life of the battery system 100.

These health indicators 500 also allow a user to know when the battery system 100 is nearing the end of its useful life. Along with battery charge and discharge rates 502, 504 of the battery system 100 (for example short circuit detection), threshold voltages 506 are available as health indicators. In addition, the BMS health 508 is an indicator that triggers when service may be required for the battery system 100.

As discussed in detail with regard to FIG. 3, the BMS 102 allows individual cells of the battery pack 104 to be charged and discharged at about the same rate so that no single cell will be stressed. In this way, cell lifetimes may be maximized and, thus, lifetime of battery pack 104 maximized. However, when the BMS health 508 is indicated as needing service, all other health indicators come into question until the BMS 102 addresses any health issues.

Functional descriptive material is information that imparts functionality to a machine. Functional descriptive material includes, but is not limited to, computer programs, instructions, rules, facts, definitions of computable functions, objects, and data structures.

Figure 6:
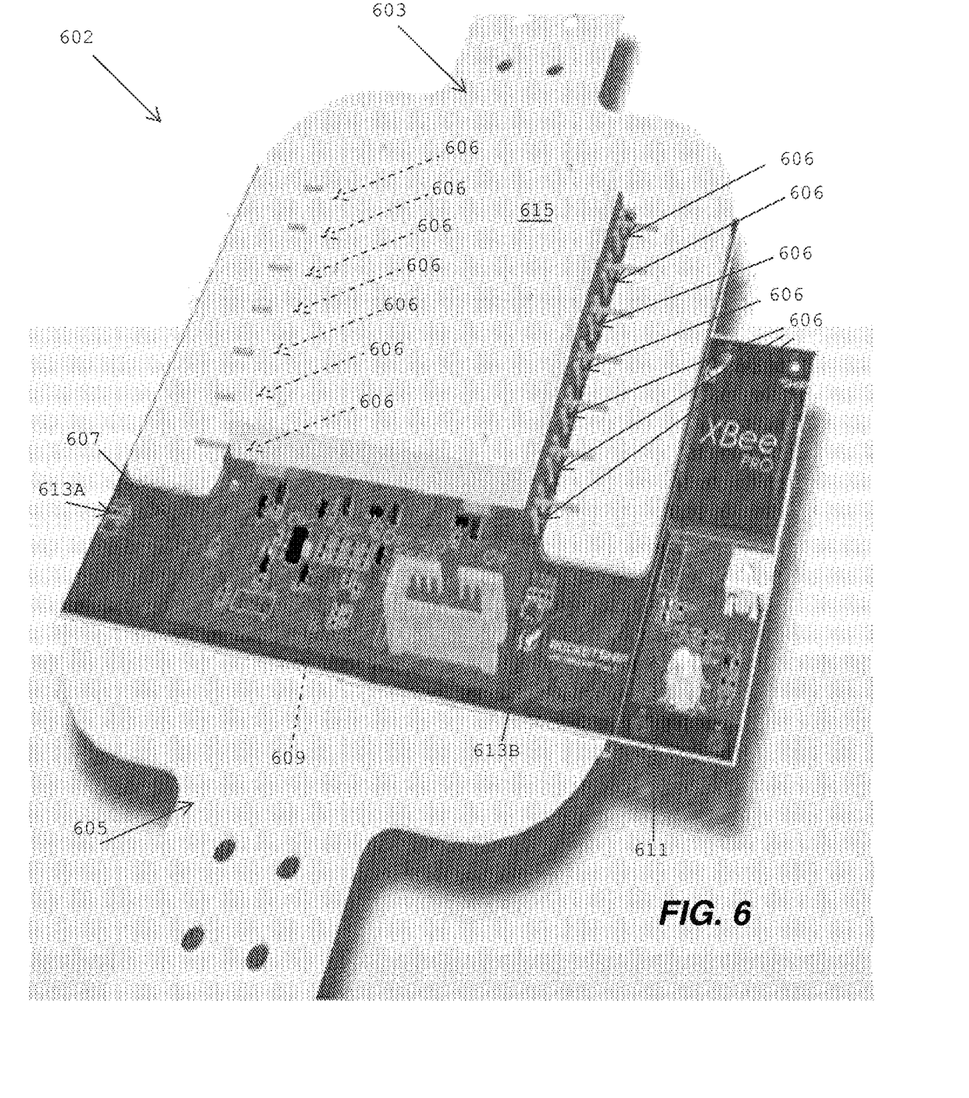
FIG. 6 is a perspective view of the BMS that depicts embodiments of the BMS as described herein.

FIG. 6 is a perspective view of a battery management system (BMS) 602 such as the BMS 102 described herein, according to one embodiment of the present disclosure. The following describes features and methods to be included in an integrated battery management system that may be used for high current batteries, such as an automotive starter battery, as well as other battery-powered units and implementations.

In one embodiment, the BMS 102 may include a first buss bar 603, a second buss bar 605, a printed circuit board (PCB) 607, and a plurality of semiconductor switches 606 (such as metal-oxide semiconductor field-effect transistors (MOSFETS)) attached to the PCB 607. The BMS 102 may further include a microcontroller (MCU) 609 attached to the PCB 607 to control timing of switching the semiconductor switches 606 on and off at different rates, as will be discussed in more detail. (As pictured, the MCU 609 is actually attached to an underside of the circuit board 605.)

First leads of the semiconductor switches 606 may be connected to forked ends of the first buss bar 603 and second leads of the semiconductor switches 606 may be connected to forked ends of the second buss bar 605. Third leads (or control leads) of the semi-conductor switches 606 are attached to the MCU 609 by way of metal lines on the circuit board 605. Opposing ends of the first buss bar 603 and the second buss bar 605 (that include the four holes) are connected to the battery pack 104 and the electrical system. The battery pack 104 may be connected to one of the opposing ends and the electrical system may be connected to the other opposing end, such that the BMS 102 electrically isolates the battery pack 104 from the electrical system by way of the semiconductor switches 606. FIG. 6 does not show the battery pack 104 or the electrical system to not obscure the view of the various components of the BMS 102.

The BMS 102 may further include a communications board 611 attached to the circuit board to provide communication capability (whether wired or wireless as discussed herein). The BMS 102 may further include a first Hall Effect sensor 613A and a second Hall Effect sensor 613B, in addition to a heat tie 615.

Cell-Balancing

When a cell bank is fully charged, embodiments include that energy be diverted passively or actively. Passive cell balancing diverts the excess energy to a bank of resistors that are able to dissipate the extra energy as heat. Active cell-balancing diverts excess charging to other cell banks. Using an active diversion may be advantageous when helping the battery recharge at a fast rate and requiring minimal energy to do so. Cell balancing is beneficial because it prevents unbalanced cell banks that lead to overcharging of the bank and damage to cells, as well as preventing inability for the battery to be fully charged.

Circuit Isolation (or Lock-Out)

The battery circuit may be isolated automatically due to a number of specified reasons as described herein. The battery circuit may also be isolated manually as needed.

To achieve circuit isolation or cut-off, the BMS 602 may utilize the semiconductor switches 606, such as MOSFETS, arranged as a group in parallel to isolate an entire pack of cells (not shown in FIG. 6), and not simply individual cells. Also, the following features may be included in the layout of the BMS 606 and the microcontroller 609 to prevent overloading a single one of the semiconductor switches 606:

a) Trace matching—Embodiments include traces of such length that current traveling along paths reach corresponding semiconductor switches 606 at the same time or within fractions of nanosecond of the same time.

b) Split columns—Embodiments further include that the semiconductor switches 606 be physically located in parallel lines, forming two or more columns along the buss bar. Such a configuration is advantageous because it minimizes the distance between semiconductors, for example, the distance between the first semiconductor switch in the line and the last semiconductor in the line. Such a configuration is conducive to making each path to a semiconductor be equal in length.

c) Heat-tied—Embodiments further include that a heat-conducting material, such as an aluminum bar (or a heat tie) 615, be used to maintain temperature equilibrium among the semiconductors. By using a heat-conducting bar centrally located between the two or more columns of semiconductors, thermal efficiency may be achieved. In effect, the split column arrangement allows for a tight grouping of the semiconductor switches 606 around the heat-conducting bar, which aids in maintaining a uniform temperature across all of them.

d) Slow-speed switching—Because electricity travels at the speed of light, conventional wisdom implies that the difference in the time it takes to travel to each semiconductor is negligible. Therefore, conventional systems switch semiconductors off as fast as possible. A counter-intuitive approach, however, views switching speeds in a matter of nanoseconds as significant in allowing time for each semiconductor to equalize. Time may also be useful in reducing stress in the system. Embodiments therefore include that the microcontroller 609 switch the semiconductor switches 606 at a slow rate to allow time for the current in each semiconductor to equalize and reduce stress. Using one or more of the physical layouts and variations described, a slower time than conventionally found to allow current in a series of semiconductors to equalize may be used. Approaches may be used that switch the semiconductor switches 606 as slow as possible. Approaches further include that switching times be set in the firmware executed by the microcontroller 609.

Low power draw—Optimizing a low power draw may also be included in the BMS 602 circuit. Although this implementation has the capability of drawing a lot of power and ultimately draining a battery, embodiments include that the BMS 602 spend a substantial time in "sleep" mode or other mode that draws little current and has little energy leakage. The time in this mode may be the majority of the time, such as 99% of the time, or less than half the time.

During the low power state, the MCU 609 may power down one or more of the auxiliary circuitry and put itself in an ultra-low power state. Also, the MCU 609 may be activated periodically to monitor vital signs, or be activated when an event occurs that requires attention.

Analog-to-digital converter (ADC)—Embodiments further include that the ADC of the MCU 609 read the voltage of the battery pack 102 and receive signals from other circuits to determine whether a shut-off is desired or otherwise necessitated. Features described herein may be set with specified values and thresholds. This is advantageous because it allows for quick and easy custom configurations for diverse applications such as automotive and marine engine starting, auxiliary power units, emergency power storage, etc.

a) Reserve Lock-Out: If the voltage is below a set specified value, the circuit may be isolated from the battery, e.g., the battery pack 104. This function may then be reset by the user, either manually or wirelessly. A manual method may include, for example, pressing a reset button for 3 seconds or several seconds, to reconnect the battery circuit. This is advantageous because the isolation provides an early warning that the battery level is reaching the low voltage threshold.

b) Low-voltage Lock-out: If the voltage drops below a specified value, the battery pack may be isolated and not reconnect until the voltage has risen to a specified value, typically through recharging although other means are anticipated. This prevents over-discharging, thereby optimizing the cycle life of the battery.

Embodiments further include that the user be restricted from overriding the low voltage value.

c) User-initiated Lock-out: Certain applications may be desired to allow a specific current or range of currents to pass. For example, the BMS 602 may be set to allow a low current to pass continuously while preventing a high current from passing.

Such applications may be useful, for example, to prevent automotive theft. For example, while a car owner was away from his or her vehicle, the high current associated with a thief's attempt to start the ignition would active a lock out.

This feature may also allow a user to do one or more of the following: disable a battery remotely, cause a "self-destruct" in which case future use of the battery is destroyed, or set the battery in "anti-theft" mode such that only a low specified number of amps may be drawn from the battery. In "anti-theft" mode, functions such as running the clock, radio, and security features, may still be utilized. The BMS 602 may detect a sudden increase in current draw, shut down the battery and alert the owner through the communication board 611.

d) Temperature Lock-out: Embodiments include that a temperature sensor coupled to the buss bars 103 and 105 that may be used to measure the temperature of each buss bar.

When the buss bar 603 or 605 reaches the maximum temperature threshold, the battery may be isolated from the circuit until the buss bar temperature has dropped to below the reset temperature. A reset temperature may be, for example, 65 degree Celsius (or 5 degrees below the maximum threshold).

Such action prevents damage to the battery and reduces the potential for fire due to high internal temperatures that may be caused by, for example, high ambient temperatures or drawing too much current for too long.

e) Short-circuit Lock-out: Short circuit protection may be used to prevent damage to the battery pack 104 and the risk of arcing and fire. To this end, the battery pack 104 may be isolated from the circuit until the short circuit is released or a specified amount of time has passed. Embodiments include a magnetic sensor, such as the first Hall Effect sensor 113A and the second Hall Effect sensor 113B, which measure the magnetic field of the buss bar. When a specified level is met a signal is sent that a short circuit has occurred or is occurring.

It is to be understood that the disclosure is defined by the appended claims. It will be understood by those with skill in the art that if a specific number of an introduced claim element is intended, such intent will be explicitly recited in the claim, and in the absence of such recitation no such limitation is present.

What is claimed is:

1. An apparatus comprising:
    isolation circuitry including multiple semiconductor switches arranged electrically in parallel to isolate a plurality of battery cells when connected to a battery containing the plurality of battery cells, wherein the battery is capable of providing high levels of current; and
    a microcontroller operatively coupled with to the isolation circuitry,
    wherein the battery cells are isolated from an electrical system to which the battery is connected when the microcontroller switches off the multiple semiconductor switches,
    wherein the microcontroller is programmed to turn off the multiple semiconductor switches when a high threshold current comprising at least 2,000 amperes is sensed over a short period of time, such that amperage levels required to start a vehicle are not misinterpreted as an excess of current indicative of a current surge.

2. The apparatus of claim 1, wherein the multiple semiconductor switches are metal-oxide semiconductor field-effect transistors (MOSFETs).

3. The apparatus of claim 1, further comprising
    multiple metal traces connecting respective semiconductor switches to the microcontroller, wherein the metal traces are of a substantially equal length such that a signal to turn off the multiple semiconductor switches reaches the multiple semiconductor switches at substantially the same time.

4. The apparatus of claim 1, further comprising:
a first buss bar to which first leads of the multiple semiconductor switches are connected and for connecting to one of the battery and the electrical system;
a second buss bar to which second leads of the multiple semiconductor switches are connected and for connecting to the other of the battery and the electrical system; and
a printed circuit board located between the first and second buss bars and on which is located the microcontroller.

5. The apparatus of claim 4, wherein the first buss bar is horseshoe shaped, and wherein the multiple semiconductor switches are arranged along inner, opposing sides of the first buss bar.

6. The apparatus of claim 4, wherein the multiple semiconductor switches are arranged in two or more columns along the first buss bar and the second buss bar.

7. The apparatus of claim 1, further comprising
a heat-conducting bar made of a heat-conducting metal and thermally coupled to the multiple semiconductor switches.

8. The apparatus of claim 1, wherein the multiple semiconductor switches are to operate within a range of switching rates, and wherein the microcontroller is programmed to switch off the multiple semiconductor switches at a slow rate within the range of switching rates.

9. The apparatus of claim 1, wherein the microcontroller is programmed to turn off the multiple semiconductor switches substantially simultaneously upon receipt of a signal from a sensor or electrical device.

10. The apparatus of claim 9, wherein the signal is indicative of a condition selected from a group comprising: a short circuit in the electrical system, overheating of the battery, a low-voltage threshold of the battery, a user-initiated shut off, or a current surge from the battery over a threshold current.

11. An isolation device comprising:
circuitry for connection to a terminal of a battery, the battery capable of imparting high levels of current, and the circuitry including:
a first buss bar;
a second buss bar;
multiple semiconductor switches arranged electrically in parallel and in at least two columns on the first and second buss bars, wherein first leads of the multiple semiconductor switches are attached to the first buss bar and second leads of the multiple semiconductor switches are attached to the second buss bar; and
a microcontroller programmed to control the multiple semiconductor switches responsive to receipt of a control signal, wherein the microcontroller is programmed to shut off the multiple semiconductor switches when the control signal is indicative of a predetermined condition, and wherein the predetermined condition comprises a high threshold current comprising at least 2,000 amperes sensed over a short period of time, such that amperage levels required to start a vehicle are not misinterpreted as an excess of current indicative of a current surge.

12. The isolation device of claim 11, wherein the multiple semiconductor switches are metal-oxide semiconductor field-effect transistors (MOSFETs).

13. The isolation device of claim 11, further comprising:
a printed circuit board located between the first and second buss bars and to which is attached the microcontroller; and
an analog-to-digital converter on the printed circuit board configured to convert a sensed parameter to a digital signal to be sent as the control signal to the microcontroller.

14. The isolation device of claim 13, further comprising multiple metal traces on the printed circuit board connecting respective semiconductor switches to the microcontroller, wherein the metal traces are of a substantially equal length such that a shut-off signal to turn off the multiple semiconductor switches reaches the multiple semiconductor switches at substantially the same time.

15. The isolation device of claim 11, further comprising
a heat-conducting bar made of a heat-conducting metal and thermally coupled between the at least two columns of the multiple semiconductor switches.

16. The isolation device of claim 11, wherein the multiple semiconductor switches are to operate within a range of switching rates, and wherein the microcontroller is programmed to switch off the multiple semiconductor switches at a slow rate within the range of switching rates.

17. The isolation device of claim 11, wherein the microcontroller is further programmed to control the multiple semiconductor switches responsive to receipt of a second control signal indicative of a second predetermined condition, wherein the second predetermined condition comprises a reserve voltage below which an operator is alerted to reset the battery in order to access reserve capacity.

18. The isolation device of claim 11, wherein the microcontroller is further programmed to control the multiple semiconductor switches responsive to receipt of a second control signal indicative of a second predetermined condition, wherein the second predetermined condition a low-voltage threshold below which the microcontroller shuts off the multiple semiconductor switches to protect the battery from over-discharging.

19. The isolation device of claim 11, wherein the microcontroller is further programmed with a critical low voltage for the battery, below which the microcontroller causes the battery to enter a hibernation mode of extremely low current consumption when compared with normal operation of the battery.

20. A system comprising:
a battery pack having multiple battery cells to power an electrical system and that is capable of providing at least high levels of current;
isolation circuitry connected to a terminal of the battery pack and including:
a first buss bar;
a second buss bar, wherein either the first buss bar or the second buss bar is connected to the terminal of the battery pack;
multiple semiconductor switches arranged electrically in parallel and in at least two columns on the first buss bar and the second buss bar, wherein first leads of the multiple semiconductor switches are attached to the first buss bar and second leads of the multiple semiconductor switches are attached to the second buss bar; and
a microcontroller programmed to control the multiple semiconductor switches responsive to receipt of a control signal, wherein the microcontroller is programmed to shut off the multiple semiconductor switches when the control signal is indicative of a predetermined condition, and wherein the predetermined condition comprises a high threshold current comprising at least 2,000 amperes sensed over a short period of time, such that amperage levels required to start a vehicle are not misinterpreted as an excess of current indicative of a current surge.

21. The system of claim 20, further comprising
multiple metal traces connecting respective semiconductor switches to the microcontroller, wherein the metal traces are of a substantially equal length such that a shut-off signal to turn off the multiple semiconductor switches reaches the multiple semiconductor switches at substantially the same time.

22. The system of claim 20, further comprising
a heat-conducting bar made of a heat-conducting metal and thermally coupled to the multiple semiconductor switches.

23. The system of claim 20, wherein the multiple semiconductor switches operate within a range of switching rates, and wherein the microcontroller is programmed to switch off the multiple semiconductor switches at a slow rate within the range of switching rates.

* * * * *